Patented Aug. 8, 1950

2,517,651

UNITED STATES PATENT OFFICE 2,517,651

TREATMENT OF WATERS FOR HUMAN CONSUMPTION AND IODINE-DIGLYCINE HYDRIODIDE COMPOSITION USEFUL IN SUCH TREATMENT

Walter S. Frost, Auburndale, Mass., assignor to Burnham Soluble Iodine Company, Auburndale, Mass., a corporation of Massachusetts No Drawing. Application October 16, 1944, Serial No. 558,972

5 Claims. (Cl. 167—17)

This invention relates to disinfection of waters and more specifically to the preparation of iodine-containing compounds having rapid bactericidal and cysticidal action in waters of normal and low temperatures.

The invention is concerned particularly with the preparation of such compounds in dry form—to the end that they may be more readily packaged, handled and dispensed—but which, even in the dry form, possess the convenient characteristic of rapid iodine dissolution when the compound is added to water to be disinfected, accompanied by rapid completion of bactericidal and/or cysticidal action. The compounds in prescribed dosages adequate for disinfection are not toxic and do not render the water palatably intolerable. Further, the compounds are sufficiently stable so that they may be preserved in properly sealed containers over long periods of time without loss of effectiveness.

The compounds of this invention, while they may be packaged in dry bulk, are preferably formed into tablets, each tablet containing a free iodine content chosen as sufficient to render the tablet bactericidal and cysticidal when added to a prescribed quantity of water. Ease and accuracy of dosage and compactness in packaging are thus secured.

In order to secure high rate of solution of free iodine in the water to be disinfected and also provide a tablet which is relatively stable in packaged form, the compound of which the tablets are formed contains, together with crystalline iodine, a non-deliquescent iodine-solubilizing agent. A most suitable iodine-solubilizing agent of this type is diglycine hydriodide.

Since the iodine demand of natural waters is somewhat less in acid than in basic solution and hence given free iodine dosages tend to be bactericidally and cysticidally more effective under acid conditions (below pH 7.0), the iodine and non-deliquescent solubilizing agent are preferably further compounded with some palatable mild acidifying agent. In keeping with the purposes of providing a non-deliquescent compound, the acidifying agent should be non-hygroscopic. Disodium dihydrogen pyrophosphate ($Na_2H_2P_2O_7$) is considered a preferred non-hygroscopic acidifying agent.

Where the compound is to be formed into tablets, these three ingredients may be compounded with a tablet machine lubricant in the following proportions:

| | Parts by weight |
|---|---|
| Iodine | 82 |
| Non-deliquescent iodine-solubilizing agent (diglycine hydriodide) | 180 |
| Acidifying agent (disodium dihydrogen phosphate) | 821 |
| Tablet machine lubricant (talc or the like) | 94 |
| | 1177 |

If the parts in the above formula be taken in grams, such material will be sufficient to form ten thousand tablets of a preferred composition, that is, each tablet weighing about 118 mgs. and each tablet containing 8.2 mgs. of free iodine and a total iodine content of 16.4 mgs., thus:

| | Mgs. |
|---|---|
| Iodine | 8.2 |
| Diglycine hydriodide (45.64% I) | 18. |
| Disodium dihydrogen pyrophosphate | 82.1 |
| Talc | 9.4 |

A preferred method of tablet manufacture is as follows:

Crystalline iodine is intimately mixed with the diglycine hydriodide, both ingredients being as thoroughly dry as conveniently possible. When substantial uniformity in the proportion of the ingredients in each tablet is important, as it usually is, to insure accurate and uniform dosages in the use of each tablet, the mixing should be thorough and with the ingredients in finely divided condition. For example, these ingredients are preferably ground to a fineness of about 200 mesh or to such a degree of fineness that the iodine will rapidly dissolve in water on treating approximately 0.1 gram of the mixture with 50 cc. of water. These ingredients should be protected from direct contact with metal during grinding, in so far as possible. The pyrophosphate is prepared by adding a small amount of water thereto with thorough mixing. 14½ pints of water per 100 pounds of pyrophosphate is suitable. The moist pyrophosphate is then screened (e. g. through a No. 10 screen) dried thoroughly (e. g. 160° F. overnight) and then granulated through a second finer screen (e. g. No. 20). The pyrophosphate and the mold lubricant (powdered talc) are then added to the previously ground mixture of iodine and diglycine hydriodide to form an intimate admixture of the ingredients. Efforts should be made to see that all the ingredients are thoroughly dry before using.

The mixture is then put through a tablet machine to form compact self-supporting tablets. The machine is preferably so adjusted that ten tablets weigh approximately 1.18 grams. The pressure is made such that a tablet dissolves in 30 seconds when tested as follows:

A tablet is added to one liter of water at 20° C. in a one-liter measuring flask and the time noted. When the tablet has sunk to the bottom, the flask is tipped through 180° and held until the tablet sinks through the water and the process repeated until the tablet dissolves and the time again noted.

The talc, as has been previously indicated, is used for the sole purpose of improving the tablet-forming operation and is not required if the compound is to be used in bulk. Talc is mentioned only as a preferred lubricant and it will be readily understood that other substances heretofore used for the same purposes can be substituted. Among tablet machine lubricants are paraffin wax, neutral white soap, stearic acid, white oil, zinc stearate, etc.

At 0° C., under a dissolution test as above given, the solubility time of each tablet of the preferred weight and composition is as low as 75 seconds.

A tablet as above described when added to a quart of water has been found cysticidal at 23° C. in normal waters in 5 minutes, in moderately polluted, alkaline and turbid waters in 10 minutes, and in cold waters (5° C.) in 20 minutes. In the case of unusually heavily polluted waters such as waters rich in leaf extract, two tablets are used. As illustrative of the effectiveness of the tablets, tests may be summarized as showing that one tablet per quart of water reduces $E.$ $coli$, $E.$ $typhosa$, $S.$ $dysenteriae$, and $S.$ $schottmulleri$ from concentration of about $50 \times 10^6$ to $100 \times 10^6$ per 100 ml. to an average of about 1 to 5 per 100 ml. (most probable number: MPN) at 25° C. in normal, mildly polluted alkaline, turbid, and cold (7° C.) waters.

The amount of free iodine present in each tablet as above given has been chosen on the following basis:

The normal iodine demand of moderately polluted natural waters can be taken as roughly up to 5.5 mgs. per quart in 20 minutes. Thus the tablet free iodine content of 8.2 mgs. provides a satisfactory margin of safety for disinfecting one quart of water, though this content could be reduced, or for heavily polluted waters could be increased. However, increase in free iodine content will increase the total iodine content of the tablet and make the taste and odor of the water unnecessarily disagreeable. For this reason the tablet is designed for use in natural waters without excessive alkalinity or pollution, two tablets being prescribed for extreme cases.

With regard to the amount of iodine-solubilizing agent included in the tablet, it has been found that in order to produce suitably rapid dissolution of 8.2 mgs. of iodine per quart of water when diglycine hydriodide is used as the solubilizing agent, the diglycine hydriodide should be present in the proportion of about one molecule of diglycine hydriodide to one atom of iodine. Lesser amounts of diglycine hydriodide will decrease the iodine solubility rate and larger amounts will unnecessarily increase the total tablet iodine content, which, in the preferred tablet already described, is 16.4 mgs., well below the toxic level. However, with recognition of these limiting factors, some variation may be readily made from the 1–1 ratio.

The acidifying agent is included in a proportion such that the tablet is designed to reduce the pH of waters without excessive alkalinity below 7.0 and preferably to between 4.0 and 6.5, a range which includes a point of fairly well defined minimum taste and odor of the dosed water lying between 4.5 and 5.5. Palatability improves with decreasing water temperature also.

The amount of talc or other tablet machine lubricant used is entirely a matter of mechanical tablet formation; the lubricant can be dispensed with if adequate tablet inspection discards imperfect and underweight tablets.

While the solubilizing agent used is non-deliquescent, the compound of this invention should be packaged in a moisture-proof container such as a suitably lined screw cap glass bottle. The tablets as thus packaged remain unaffected even at 140° F. for a period of three months except for a slight decrease in the rate of solubility from thirty seconds to about seventy-five seconds at 20° C. Where the package is to be repeatedly reopened in a warm and humid climate, a dehumidifying agent, such as anhydrous calcium sulfate, can be included, if desired, in the package with the tablets.

I claim:

1. A water-disinfecting tablet comprising a finely divided admixture of iodine and diglycine hydriodide in the approximate ratio of one molecule of diglycine hydriodide to one atom of iodine, together with disodium dihydrogen pyrophosphate as a palatable non-hygroscopic acidifying agent, said tablet having a free iodine content of about 8.2 mgs. and a total iodine content not exceeding about 17 mgs.

2. A water-disinfecting compound comprising the product resulting from mixing iodine and diglycine hydriodide in the approximate ratio of one molecule of diglycine hydriodide to one atom of iodine, together with an acidifying agent in the form of disodium dihydrogen pyrophosphate.

3. A water-disinfecting compound comprising an intimate admixture of the following ingredients in substantially the following proportions:

| | Parts by weight |
|---|---|
| Crystalline iodine | 82 |
| Diglycine hydriodide | 180 |
| Disodium dihydrogen pyrophosphate | 821 |

4. A compact water-disinfecting tablet comprising iodine, a non-deliquescent iodine-solubilizing agent in the form of diglycine hydriodide in a proportion of about one molecule of diglycine hydriodide to one atom of iodine, disodium dihydrogen pyrophosphate, and a tablet machine lubricant, the total iodine content of said tablet not exceeding 17 mgs. and the total weight of said tablet being only about seven times the weight of said total iodine content.

5. The method of treating water which comprises mixing into the water in the presence of disodium dihydrogen pyrophosphate for reducing the pH of the water to less than 7.0, an amount of crystalline iodine in excess of the iodine demand of said water at the pH of addition, and sufficient diglycine hydriodide to provide a ratio of diglycine hydriodide to iodine of one molecule to one atom.

WALTER S. FROST.

(References on following page)

REFERENCES CITED

The following references are of record in the file of this patent:

UNITED STATES PATENTS

| Number | Name | Date |
|---|---|---|
| 1,557,266 | Moore | Dec. 27, 1922 |
| 1,812,238 | Hammer | June 30, 1931 |
| 1,867,222 | Karns | July 12, 1932 |
| 2,128,741 | Fisk | Aug. 30, 1938 |
| 2,281,612 | Witte | May 5, 1942 |

OTHER REFERENCES

Fair, Gordon M., Interim Report No. 2, July 1, 1944. To Committee on Medical Research of the Office of Scientific Research and Development. Contract OEM-251, Subject: Disinfection of Water. Restricted.